(12) United States Patent  
Kwon et al.

(10) Patent No.: US 8,339,932 B2  
(45) Date of Patent: Dec. 25, 2012

(54) HYBRID MULTIPLE ACCESS APPARATUS AND METHOD IN A MOBILE COMMUNICATION SYSTEM

(75) Inventors: Hwan-Joon Kwon, Hwaseong-si (KR); Dong-Hee Kim, Yongin-si (KR); Jin-Kyu Han, Seoul (KR); Yu-Chul Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1267 days.

(21) Appl. No.: 11/699,195

(22) Filed: Jan. 29, 2007

(65) Prior Publication Data

US 2007/0291634 A1 Dec. 20, 2007

(30) Foreign Application Priority Data

Jan. 27, 2006 (KR) .................. 10-2006-0009157

(51) Int. Cl.
*H04J 11/00* (2006.01)
*H04B 7/212* (2006.01)
*H04B 1/00* (2006.01)
*H04K 1/10* (2006.01)

(52) U.S. Cl. ....... 370/208; 370/330; 370/347; 455/63.1; 455/278.1; 375/260

(58) Field of Classification Search .................. 370/319, 370/320, 321, 326, 342, 203–210, 329, 335–337, 370/344–347; 455/69, 451, 63.1, 67.16, 455/278.1, 330, 335, 504, 525; 375/260–262, 375/130–132, 219, 295–298, 341, 346

See application file for complete search history.

(56) References Cited

U.S. PATENT DOCUMENTS

| 5,933,421 | A | 8/1999 | Alamouti et al. | |
|---|---|---|---|---|
| 6,377,636 | B1 | 4/2002 | Paulraj et al. | |
| 6,493,331 | B1 | 12/2002 | Walton et al. | |
| 6,870,826 | B1 | 3/2005 | Ishizu | |
| 7,715,460 | B2 * | 5/2010 | Tsai et al. | 375/131 |
| 2001/0024431 | A1 * | 9/2001 | Koo et al. | 370/335 |
| 2002/0118765 | A1 | 8/2002 | Nangia et al. | |
| 2004/0100921 | A1 * | 5/2004 | Khan | 370/321 |
| 2004/0141481 | A1 * | 7/2004 | Lee et al. | 370/335 |
| 2004/0264507 | A1 * | 12/2004 | Cho et al. | 370/480 |
| 2005/0063345 | A1 * | 3/2005 | Wu et al. | 370/335 |
| 2005/0249177 | A1 * | 11/2005 | Huo et al. | 370/342 |
| 2006/0018279 | A1 * | 1/2006 | Agrawal et al. | 370/330 |
| 2006/0062320 | A1 * | 3/2006 | Luz et al. | 375/269 |
| 2006/0114815 | A1 * | 6/2006 | Hasegawa et al. | 370/208 |
| 2006/0203845 | A1 * | 9/2006 | Monogioudis | 370/466 |
| 2006/0268786 | A1 * | 11/2006 | Das et al. | 370/335 |
| 2006/0274842 | A1 * | 12/2006 | Pan et al. | 375/260 |

(Continued)

FOREIGN PATENT DOCUMENTS

EP 1 701 458 2/2006

(Continued)

*Primary Examiner* — Habte Mered
(74) *Attorney, Agent, or Firm* — The Farrell Law Firm, P.C.

(57) ABSTRACT

A hybrid multiple access apparatus and method in a mobile communication system supporting various multiple access schemes are provided, in which an initial service negotiation is performed in a non-orthogonal transmission scheme between an MS and a BS, the BS receives from the MS an orthogonal resource request for high-speed packet data transmission, and the BS allocates orthogonal resources to the MS based on channel estimation information indicating a channel status between the MS and the BS.

40 Claims, 25 Drawing Sheets

U.S. PATENT DOCUMENTS

| | | | |
|---|---|---|---|
| 2006/0291577 A1* | 12/2006 | Boariu | 375/260 |
| 2007/0183516 A1* | 8/2007 | Monogioudis et al. | 375/260 |
| 2007/0195690 A1* | 8/2007 | Bhushan et al. | 370/208 |
| 2009/0201872 A1* | 8/2009 | Gorokhov et al. | 370/329 |
| 2010/0098016 A1 | 4/2010 | Murakami et al. | |
| 2010/0215079 A1* | 8/2010 | Costa et al. | 375/146 |

FOREIGN PATENT DOCUMENTS

| | | |
|---|---|---|
| JP | 2000-332724 | 11/2000 |
| JP | 2003-152679 | 5/2003 |
| JP | 2004-096445 | 3/2004 |
| JP | 2004-200856 | 7/2004 |
| JP | 2005-333344 | 12/2005 |
| KR | 1020010021928 | 3/2001 |
| RU | 2264036 | 11/2005 |
| WO | WO 03/034645 | 4/2003 |
| WO | WO 03/041300 | 5/2003 |
| WO | WO 2005/015775 | 2/2005 |
| WO | WO 2005/048640 | 5/2005 |
| WO | WO 2005/122425 | 12/2005 |

* cited by examiner

HYBRID MULTIPLE ACCESS APPARATUS AND METHOD IN A MOBILE COMMUNICATION SYSTEM

PRIORITY

This application claims the benefit under 35 U.S.C. §119(a) of a Korean Patent Application filed in the Korean Intellectual Property Office on Jan. 27, 2006 and assigned Serial No. 2006-9157, the entire disclosure of which is hereby incorporated by reference.

BACKGROUND OF THE INVENTION

1. Field of the Invention

The present invention generally relates to a multiple access apparatus and method in a mobile communication system. More particularly, the present invention relates to a multiple access apparatus and method in a mobile communication system supporting a variety of multiple access schemes.

2. Description of the Related Art

Typically, mobile communication systems provide communication service to a large number of users irrespective of time and place. The mobile communication systems provide access to users in various multiple access schemes.

Two principal types of multiple access schemes used in mobile communication systems are a non-orthogonal multiple access scheme and an orthogonal multiple access scheme. Signals sent from a plurality of Mobile Stations (MSs) are non-orthogonal in the non-orthogonal multiple access scheme, whereas the signals are orthogonal in the orthogonal multiple access scheme.

A major non-orthogonal multiple access scheme is Code Division Multiple Access (CDMA). cdma2000 and Wideband CDMA (WCDMA) adopt CDMA in which a plurality of MSs send data, sharing the same frequency at the same time. Each MS is identified by a user-specific scrambling code (scrambling sequence or Pseudo-Noise (PN) sequence). Although there is no orthogonality among the scrambling sequences of different MSs, a signal received from a particular MS can become stronger by use of a processing gain, thereby making the MS identifiable.

FIG. 1 is a block diagram of a typical CDMA transmitter.

Referring to FIG. 1, a channel encoder 101 channel-encodes an input information bit sequence according to a coding method. The channel encoder 101 can be a block encoder, a convolutional encoder, a turbo encoder, or a Low Density Parity Check (LDPC) encoder. A channel interleaver 102 interleaves the coded data according to an interleaving method. While not shown in FIG. 1, it is clear that a rate matcher including a repeater and a puncturer can reside between the channel encoder 101 and the channel interleaver 102. A modulator 103 modulates the interleaved data in Quadrature Phase Shift Keying (QPSK), 8-ary Phase Shift Keying (8PSK), 16-ary Quadrature Amplitude Modulation (16QAM), or the like. A Walsh coverer 104 Walsh-covers the modulation symbols. Typically, physical channels that an MS sends include a pilot channel, a traffic channel, a pilot control channel, etc. A different Walsh function is preset for each physical channel. Thus, the MS performs the Walsh covering using a predetermined Walsh function for a physical channel to be sent.

A gain controller 105 multiplies the output of the Walsh coverer 104 by a gain suitable for the physical channel according to a predetermined rule. The channel encoding in the channel encoder 101 to the gain control in the gain controller 105 take place independently for each physical channel. The gain-added outputs for physical channels are summed in an adder 106. A mixer 107 multiplies the sum by a user-specific scrambling sequence. A baseband filter 108 converts the scrambled signal to a final baseband signal.

FIG. 2 is a block diagram of a typical CDMA receiver.

Referring to FIG. 2, a baseband filter 201, which is a matched filter corresponding to the baseband filter 108 illustrated in FIG. 1, filters a received signal. A mixer 202 multiplies the output of the filter by a user-specific scrambling sequence and a Walsh decoverer 203 decovers the descrambled signal with a Walsh function preset for a physical channel to be demodulated. A channel equalizer 204 channel-equalizes the Walsh-decovered signal according to a predetermined method. The channel equalization can be performed in many ways, which are beyond the scope of the present invention. A demodulator 205 demodulates the channel-equalized signal according to a predetermined demodulation method such as 16QAM, 8PSK, QPSK, or the like. A channel deinterleaver 206 deinterleaves the demodulated signal and a channel decoder 207 channel-decodes the demodulated signal. Thus, the original information is finally recovered.

Principal orthogonal multiple access schemes include Orthogonal Frequency Division Multiple Access (OFDMA), Time Division Multiple Access (TDMA), and Single-Carrier Frequency Division Multiple Access (SC-FDMA). OFDMA is a multiple access scheme in which a plurality of MSs send signals on different subcarriers. In TDMA, MSs send signals at different times, and in SC-FDMA, MSs send signals in different carrier frequencies. With reference to FIGS. 3 to 8, an OFDMA transmitter and receiver and an SC-FDMA transmitter and receiver will be described below in detail.

FIG. 3 is a block diagram of a typical OFDMA transmitter.

Referring to FIG. 3, a channel encoder 301, a channel interleaver 302, a modulator 303, and a gain controller 304 operate in the same manner as their counterparts illustrated in FIG. 1 and thus their description will not be provided herein. A Serial-to-Parallel Converter (SPC) 305 converts a serial gain-controlled signal to parallel signals. A subcarrier mapper 306 maps the parallel signals to subcarriers according to a predetermined mapping method.

Compared to CDMA in which physical channels sent by one MS are differentiated by covering them with different Walsh codes, they are differentiated by sending them on different subcarriers in OFDMA. In other words, the channel encoding in the channel encoder 301 to the serial-to-parallel conversion in the SPC 305 are performed independently for each physical channel. The parallel signals are mapped to subcarriers preset for the physical channel. An Inverse Fast Fourier Transform (IFFT) processor 307 IFFT-processes the output of the subcarrier mapper 306. A Parallel-to-Serial Converter (PSC) 308 converts parallel IFFT signals to a serial signal. A Cyclic Prefix (CP) adder 309 inserts a CP in the serial signal according to a predetermined method. A baseband filter 310 converts the CP-added signal to a final baseband signal.

FIG. 4 is a block diagram of a typical OFDM receiver.

Referring to FIG. 4, a baseband filter 401, which is a matched filter corresponding to the baseband filter 310 illustrated in FIG. 3, filters a received signal. A CP remover 402 removes a CP from the output of the baseband filter 401 according to a predetermined method. An SPC 403 converts the CP-free signal to parallel signals. A Fast Fourier Transform (FFT) processor 404 FFT-processes the parallel signals. A subcarrier demapper 405 extracts subcarriers mapped to a physical channel and a channel equalizer 406 channel-equalizes the subcarriers. A PSC 407 serializes the channel-equalized signal and a demodulator 408 demodulates the serial signal according to a predetermined demodulation method such as 16QAM, 8PSK, QPSK, or the like. A channel deinterleaver 409 deinterleaves the demodulated signal according to a predetermined method and a channel decoder 410 channel-decodes the deinterleaved signal, thereby recovering the original information.

FIG. 5 is a block diagram of a typical SC-FDMA transmitter.

Referring to FIG. 5, a channel encoder 501, a channel interleaver 502, a modulator 503, a CP adder 504, a gain controller 505, and a baseband filter 506 operate in the same manner as their counterparts illustrated in FIG. 3 and thus their description will not be provided herein. The output of the baseband filter 506 is subject to a user-specific phase rotation, for signal identification in a phase rotator 507. Thus, a final baseband signal is produced. The phase rotator 507 functions to send signals to MSs in different frequencies. Before the user-specific phase rotation, the transmission signal takes the form of a low pass signal as indicated by reference numeral 511. After the phase rotation, it takes the form of a predetermined-band pass signal, as indicated by reference numeral 512.

FIG. 6 is a block diagram of a typical SC-FDM receiver.

Referring to FIG. 6, a phase derotator 601 phase-derotates a received signal, for MS identification. Before the phase derotation, the received signal takes the form of a predetermined-band pass signal, as indicated by reference numeral 611. After the phase derotation, it takes the form of a low pass signal, as indicated by reference numeral 612.

A baseband filter 602, which is a matched filter corresponding to the baseband filter 506 illustrated in FIG. 5, filters the phase-derotated signal. A CP remover 603 removes a CP from the output of the baseband filter 602 according to a predetermined method. A channel equalizer 604 channel-equalizes the CP-free signal. A demodulator 605 demodulates the channel-equalized signal according to a predetermined demodulation method such as 16QAM, 8PSK, QPSK, or the like. A channel deinterleaver 606 deinterleaves the demodulated signal according to a predetermined method and a channel decoder 607 channel-decodes the deinterleaved signal, thereby recovering the original information.

While the transmitter and the receiver illustrated in FIGS. 5 and 6 implement SC-FDMA in the time domain, they may implement SC-FDMA in the frequency domain.

FIG. 7 is a block diagram of a typical SC-FDMA transmitter that implements SC-FDMA in the frequency domain.

Referring to FIG. 7, a channel encoder 701, a channel interleaver 702, a modulator 703, and a gain controller 704 operate in the same manner as their counterparts illustrated in FIG. 1 and thus their description will not be provided herein. An SPC 705 converts a serial gain-controlled signal to parallel signals. An FFT processor 706 FFT-processes the parallel signals and a subcarrier mapper 707 maps the FFT signals to subcarriers according to a predetermined method. The subcarrier mapper 707 functions to enable a signal for the MS to occupy a predetermined frequency as indicated by reference numeral 512 in FIG. 5. An IFFT processor 708 IFFT-processes the output of the subcarrier mapper 709. A PSC 709 converts parallel IFFT signals to a serial signal. A CP adder 710 inserts a CP in the serial signal according to a predetermined method. A baseband filter 711 converts the CP-added signal to a final baseband signal.

FIG. 8 is a block diagram of a typical SC-FDMA receiver that implements SC-TDMA in the frequency domain.

Referring to FIG. 8, a baseband filter 801, which is a matched filter corresponding to the baseband filter 711 illustrated in FIG. 7, filters a received signal. A CP remover 802 removes a CP from the output of the baseband filter 801 in a predetermined method. An SPC 803 converts the CP-free signal to parallel signals. An FFT processor 804 FFT-processes the parallel signals. A subcarrier demapper 805 extracts mapped subcarriers as described with reference to FIG. 7 and a channel equalizer 806 channel-equalizes the subcarriers according to a predetermined channel equalization method. An IFFT processor 807 IFFT-processes the channel-equalized signal and a PSC 808 serializes the IFFT signals. A demodulator 809 demodulates the serial signal according to a predetermined demodulation method such as 16QAM, 8PSK, QPSK, or the like. A channel deinterleaver 810 deinterleaves the demodulated signal according to a predetermined method and a channel decoder 811 channel-decodes the deinterleaved signal, thereby recovering the original information.

The non-orthogonal multiple access scheme and the orthogonal multiple access schemes have their own advantages and weaknesses. For example, CDMA suffers from interference between signals from MSs because the signals are not orthogonal. Hence, a relatively high Signal-to-Noise Ratio (SNR) cannot be expected for a signal from a particular MS. Despite this shortcoming, CDMA facilitates scheduling in that MSs send signals, sharing the same frequency at the same time. Therefore, the non-orthogonal multiple access scheme is favorable for voice communication or frequent transmissions of real-time small packet data.

In contrast, due to orthogonality among signals from MSs, OFDMA enables a relatively high SNR for a signal from a particular MS, which makes OFDMA suitable for high-peed packet transmission. Yet, support of orthogonality requires accurate scheduling. That is, orthogonal resources used by a plurality of users, i.e. subcarriers in OFDMA, transmission time in TDMA, and frequencies in FDMA need precise centralized control. In this context, OFDMA is suitable for high-speed packet transmission, but not viable for voice communications or frequent transmissions of real-time small packet data.

As described above, the orthogonal and non-orthogonal multiple access schemes have different characteristics and advantages in different aspects. Accordingly, it will be inefficient to support all services with different properties and requirements with one multiple access scheme.

SUMMARY OF THE INVENTION

An aspect of the present invention is to address at least the problems and/or disadvantages and to provide at least the advantages described below. Accordingly, an aspect of the present invention is to provide an apparatus and method for transmitting/receiving data such that services with different characteristics and requirements can be supported in a mobile communication system supporting a hybrid multiple access scheme.

Moreover, an aspect of the present invention provides a hybrid multiple access apparatus and method for transmitting/receiving data by various multiple access schemes in a mobile communication system supporting a hybrid multiple access scheme.

In accordance with one aspect of the present invention, there is provided a method for transmitting data at a transmitter in a mobile communication system supporting an orthogonal transmission scheme and a non-orthogonal transmission scheme, in which one of a first signal is generated according to the non-orthogonal transmission scheme and a second signal is generated according to the orthogonal transmission scheme, and orthogonal frequency mapping is performed on the first signal or the second signal according to a predetermined pattern. For the orthogonal mapping, one of the first signal and the second signal is output in a predetermined period according to time slot information being transmission period information and multiplied by a predetermined carrier frequency.

In accordance with another aspect of the present invention, there is provided a method for receiving data at a receiver in a mobile communication system supporting an orthogonal transmission scheme and a non-orthogonal transmission scheme, in which a hybrid multiple access signal orthogonal-frequency-mapped according to a predetermined pattern is received, a first signal of the non-orthogonal transmission scheme is distinguished from a second signal of the orthogonal transmission scheme in the hybrid multiple access signal, the first signal is demodulated, and the second signal is demodulated. For the signal reception and distinguishing, the hybrid multiple access signal is multiplied by a predetermined carrier frequency and switched as one of the first signal and the second signal according to time slot information being transmission period information.

In accordance with a further aspect of the present invention, there is provided a transmitter in a mobile communication system supporting an orthogonal transmission scheme and a non-orthogonal transmission scheme, in which a non-orthogonal signal generator generates a first signal according to the non-orthogonal transmission scheme, an orthogonal signal generator generates a second signal according to the orthogonal transmission scheme, and a subcarrier mapper performs orthogonal frequency mapping on the first signal and the second signal according to a predetermined pattern. The subcarrier mapper includes a switch for outputting one of the first signal and the second signal in a predetermined period, a multiplier for multiplying the output signal by a predetermined carrier frequency, and a switch controller for determining transmission periods for the first signal and the second signal based on externally received time slot information and controlling the switch according to the transmission periods.

In accordance with still another aspect of the present invention, there is provided a receiver in a mobile communication system supporting an orthogonal transmission scheme and a non-orthogonal transmission scheme, in which a subcarrier demapper receives a hybrid multiple access signal orthogonal-frequency-mapped according to a predetermined pattern and separately outputs a first signal of the non-orthogonal transmission scheme and a second signal of the orthogonal transmission scheme, a non-orthogonal signal receiver outputs user data by demodulating the first signal, and an orthogonal signal receiver outputs user data by demodulating the second signal. The subcarrier demapper includes a multiplier for multiplying the hybrid multiple access signal by a carrier frequency, a switch for switching the multiplied hybrid multiple access signal to one of the non-orthogonal signal receiver and the orthogonal signal receiver in a predetermined period, and a switch controller for determining transmission periods for the first signal and the second signal based on time slot information and controlling the switch according to the transmission periods.

In accordance with yet another aspect of the present invention, there is provided an uplink hybrid multiple access method in a mobile communication system in which an MS communicates with a BS on a radio channel, in which an initial service negotiation is performed between the MS and the BS in a non-orthogonal transmission scheme, the BS receives an orthogonal resource request for high-speed packet data transmission from the MS, and the BS allocates orthogonal resources to the MS based on channel estimation information indicating a channel status between the MS and the BS.

In accordance with yet further aspect of the present invention, there is provided an uplink hybrid multiple access apparatus in a mobile communication system in which an MS communicates with a BS on a radio channel, in which a non-orthogonal signal receiver receives a signal in a non-orthogonal transmission scheme from the MS, a channel estimator estimates a channel status between the MS and the BS, an orthogonal resource request detector detects an orthogonal resource request received from the MS, an orthogonal resource allocator allocates orthogonal resources to the MS based on channel estimation information received from the channel estimator, when the MS requests orthogonal resources, and an orthogonal resource allocation information transmitter notifies the MS of the allocated orthogonal resources.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides hybrid use of a CDMA multiple access scheme and an orthogonal multiple access scheme in a communication system. That is, the communication system operates in a combination of CDMA and OFDMA, TDMA or SC-FDMA. Hereinafter, the orthogonal multiple access scheme refers to any of OFDMA, FDMA, and SC-FDMA. A combination of multiple access schemes will be referred to as a hybrid multiple access scheme. "CDMA transmission" is a same frequency at the same time, and "orthogonal transmission" is a multiplexing of signals using different orthogonal resources from a plurality of users. The orthogonal resources are different time areas or different frequency areas.

In the hybrid multiple access scheme of the present invention, a multiple access scheme is selected according to the characteristics and requirement of a service to be provided and the status of an MS. Basically, a BS allows every MS CDMA transmission and supports CDMA transmission of relatively small traffic such as data for initial system access, voice traffic, frequent real-time small traffic, feedback information about the buffer status and channel status of the MS, Acknowledgement (ACK)/Non-Acknowledgement (NACK) for downlink Hybrid Automatic Repeat Request (HARQ), etc. Orthogonal transmission is applied basically to an MS that requires high-speed packet data transmission. Therefore, when the MS needs to send packets at a high rate during CDMA transmission of a small amount of packet data, it sends feedback information indicating its buffer status and channel status to the BS in CDMA and the BS additionally allocates orthogonal resources to the MS. During the operation, the BS performs a closed-loop power control on the CDMA transmission and uses an Adaptive Modulation and Coding (AMC) scheme for the orthogonal transmission.

Another feature of the present invention is that a pilot signal sent in CDMA from each MS is utilized for frequency-axis scheduling of orthogonal transmission. To be more specific, the BS determines the uplink channel status of the MS by a pilot signal received in CDMA from the MS and determines which frequency band is relatively good for the MS, for use in scheduling of an orthogonal transmission.

While the following description is made in the context of an uplink hybrid multiple access scheme, it is to be appreciated that the description also holds true for a downlink hybrid multiple access scheme.

Figure 9:
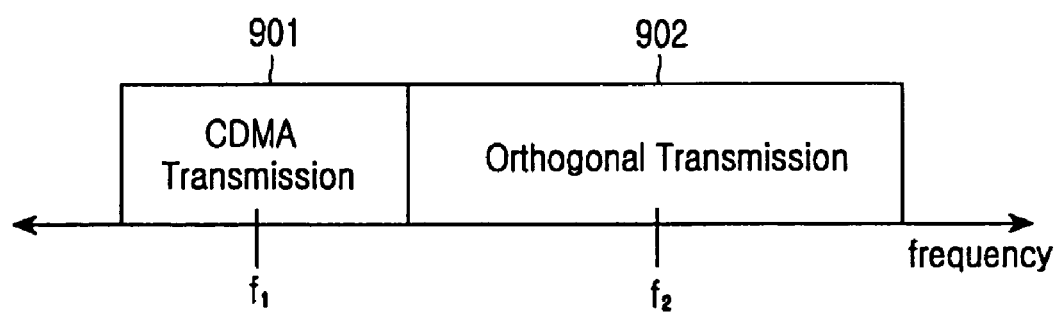
FIG. 9 illustrates CDMA transmission and orthogonal transmission in different carrier frequencies, distinguishable on a frequency axis in a hybrid multiple access scheme according to the present invention.

FIG. 9 illustrates CDMA transmission and orthogonal transmission in different carrier frequencies, distinguishable on a frequency axis in the hybrid multiple access scheme according to the present invention.

Referring to FIG. 9, the hybrid multiple access scheme divides a total system frequency band into a CDMA transmission frequency band and an orthogonal transmission frequency band. CDMA transmission 901 occurs in the CDMA transmission frequency band with a carrier frequency f1 as a central frequency and orthogonal transmission 902 occurs in the orthogonal transmission frequency band with a carrier frequency f2 as a central frequency. One thing to note is that a guard band may be inserted between the CDMA transmission frequency band and the orthogonal transmission frequency band. The CDMA transmission frequency band and the orthogonal transmission frequency band are variable with respect to the total system frequency band and information about a frequency band variation may be broadcast to all MSs.

Figure 10:
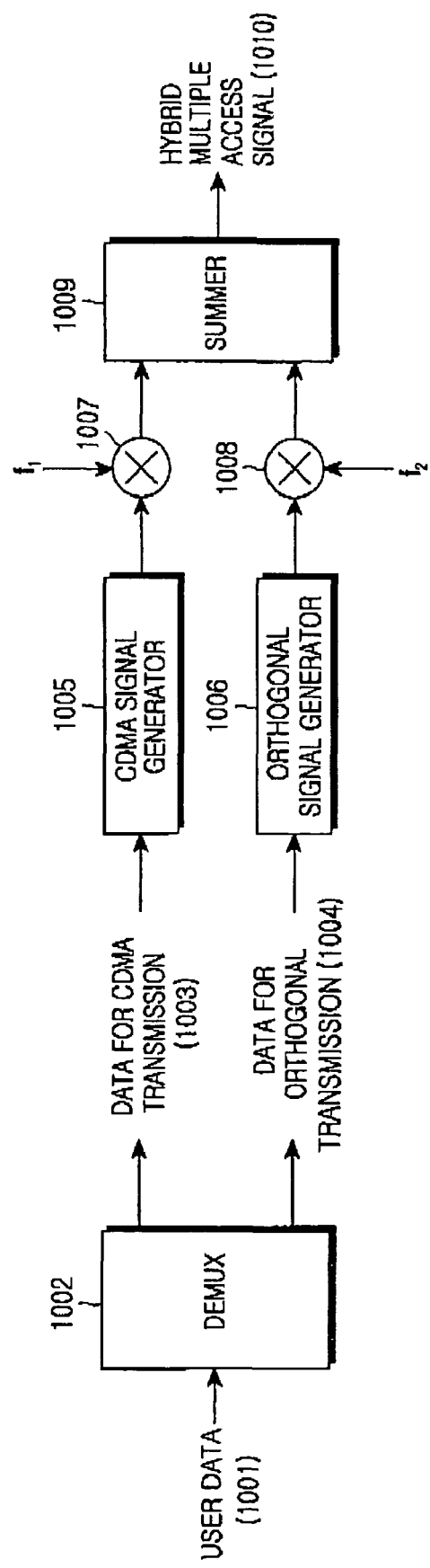
FIG. 10 is a block diagram of a transmitter that performs CDMA transmission and orthogonal transmission in different carrier frequencies as illustrated in FIG. 9 in the hybrid multiple access scheme according to the present invention.

FIG. 10 is a block diagram of a transmitter that carries out CDMA transmission and orthogonal transmission in different carrier frequencies as illustrated in FIG. 9 in the hybrid multiple access scheme according to the present invention.

Figure 1:
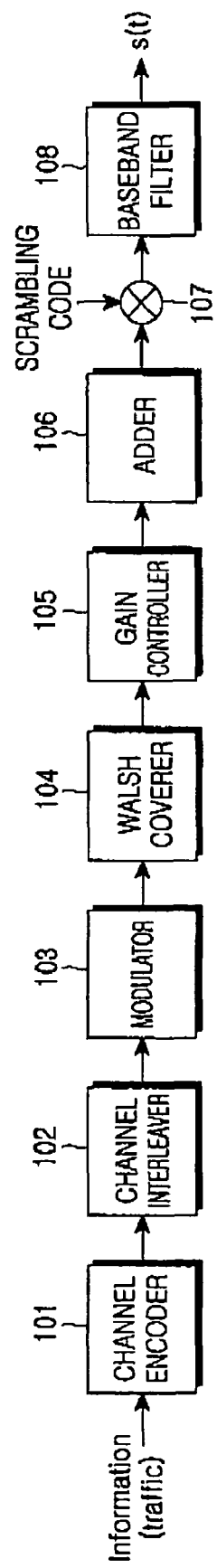
FIG. 1 is a block diagram of a typical CDMA transmitter.
Figure 3:
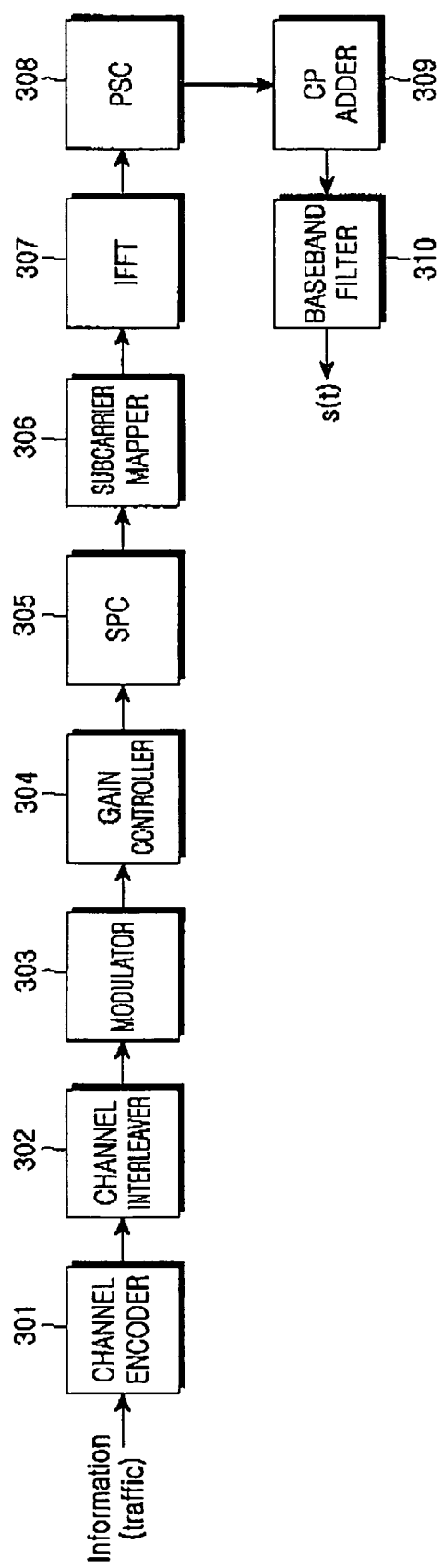
FIG. 3 is a block diagram of a typical OFDMA transmitter.
Figure 5:
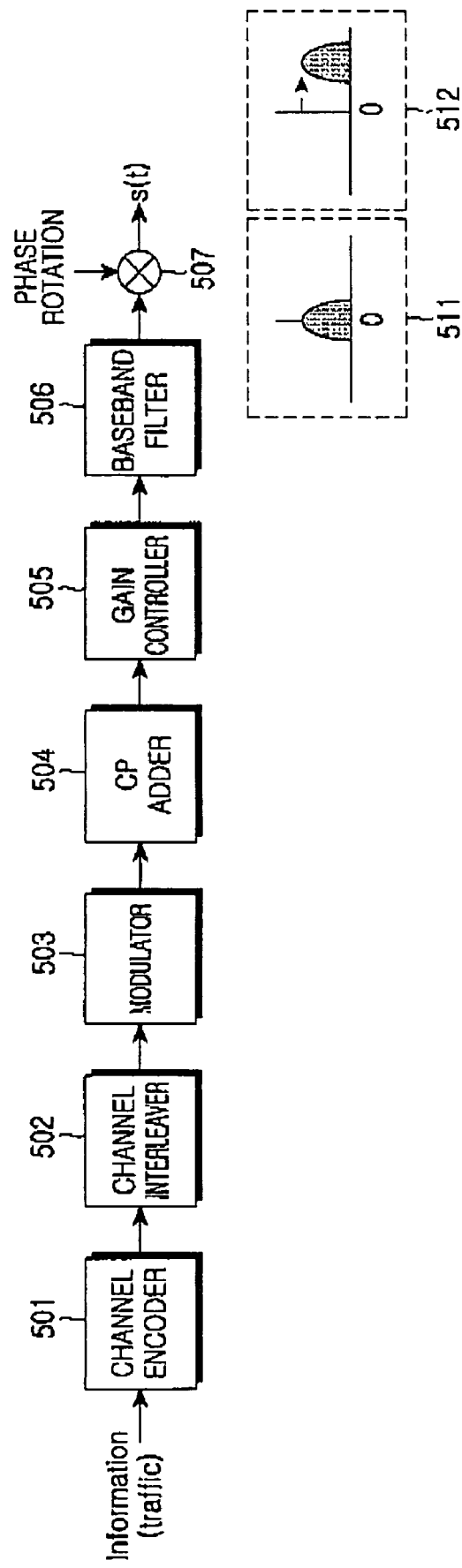
FIG. 5 is a block diagram of a typical SC-FDMA transmitter.
Figure 7:
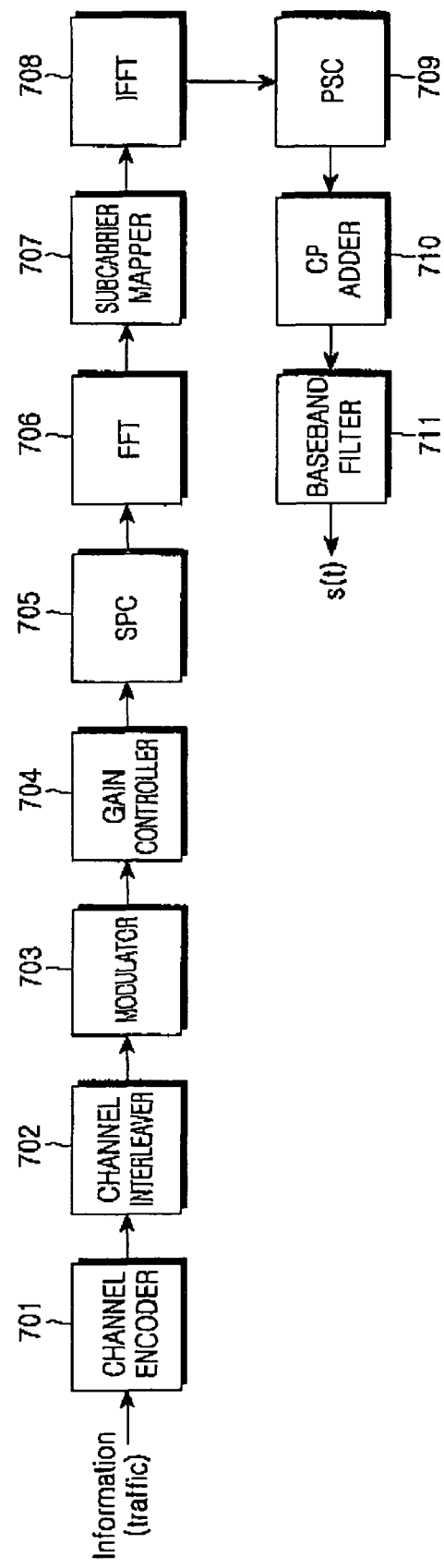
FIG. 7 is a block diagram of a typical SC-FDMA transmitter that implements SC-FDMA in a frequency domain.

Referring to FIG. 10, a Demultiplexer (DEMUX) 1002 demultiplexes user data 1001 into data 1003 for CDMA transmission and data 1004 for orthogonal transmission. The operation of the DEMUX 1002 will be detailed later. A CDMA signal generator 1005, which is identical to the typical CDMA signal generator illustrated in FIG. 1, converts the data 1003 to a CDMA signal. A first multiplier 1007 multiplies the CDMA signal by a carrier frequency f1 designated for CDMA transmission. An orthogonal signal generator 1006 converts the data 1004 to an orthogonal signal. The orthogonal signal generator 1006 is identical to the typical orthogonal signal generator illustrated in FIG. 3, 5 or 7. A second multiplier 1008 multiplies the orthogonal signal by a carrier frequency f2 designated for orthogonal transmission. A summer 1009 adds the CDMA signal and the orthogonal signal, thus producing a hybrid multiple access signal 1010.

Figure 11:
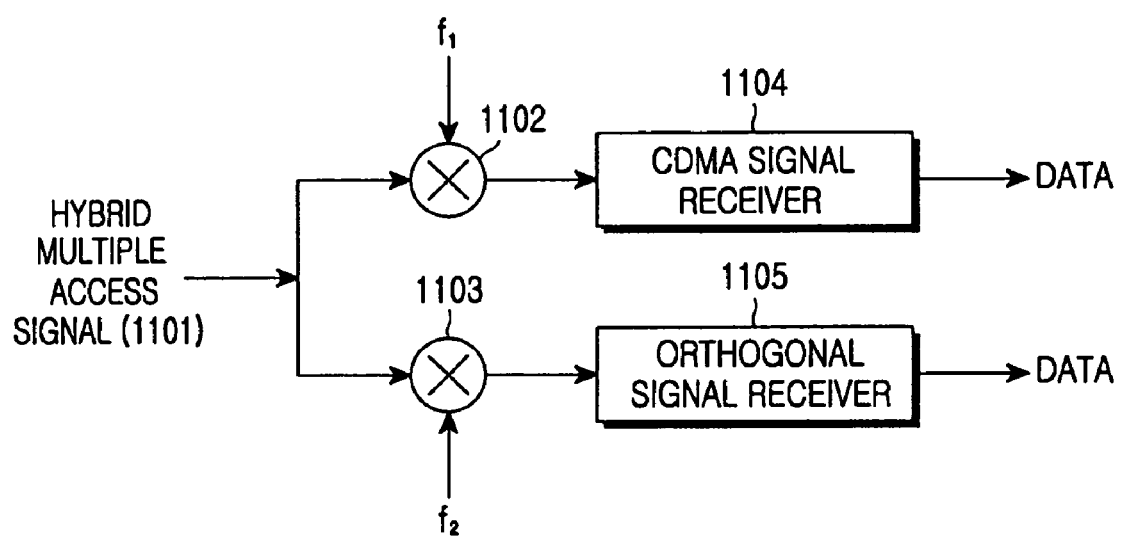
FIG. 11 is a block diagram of a receiver in case of CDMA transmission and orthogonal transmission in different carrier frequencies as illustrated in FIG. 9 in the hybrid multiple access scheme according to the present invention.

FIG. 11 is a block diagram of a receiver in case of CDMA transmission and orthogonal transmission in different carrier frequencies as illustrated in FIG. 9 in the hybrid multiple access scheme according to the present invention.

Figure 2:
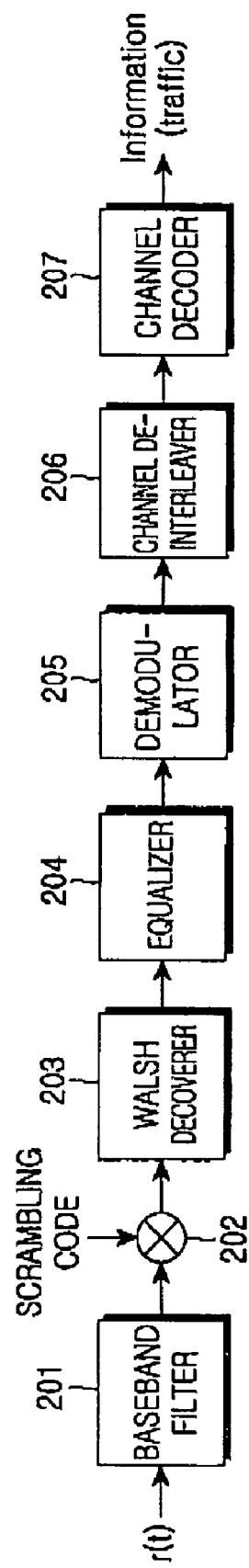
FIG. 2 is a block diagram of a typical CDMA receiver.
Figure 4:
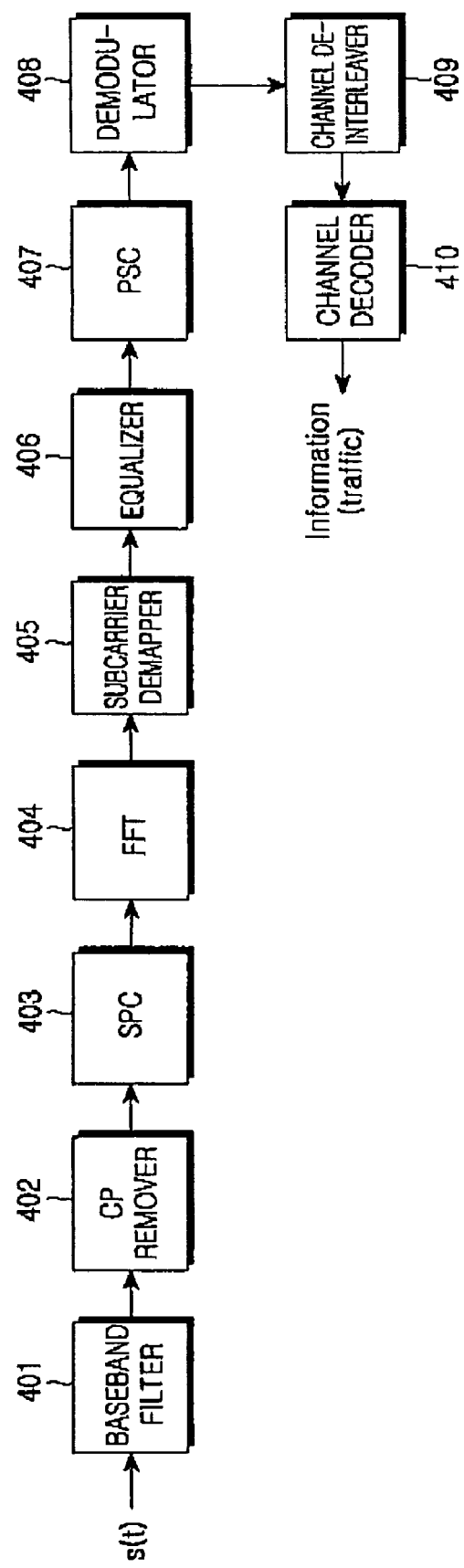
FIG. 4 is a block diagram of a typical OFDMA receiver.
Figure 6:
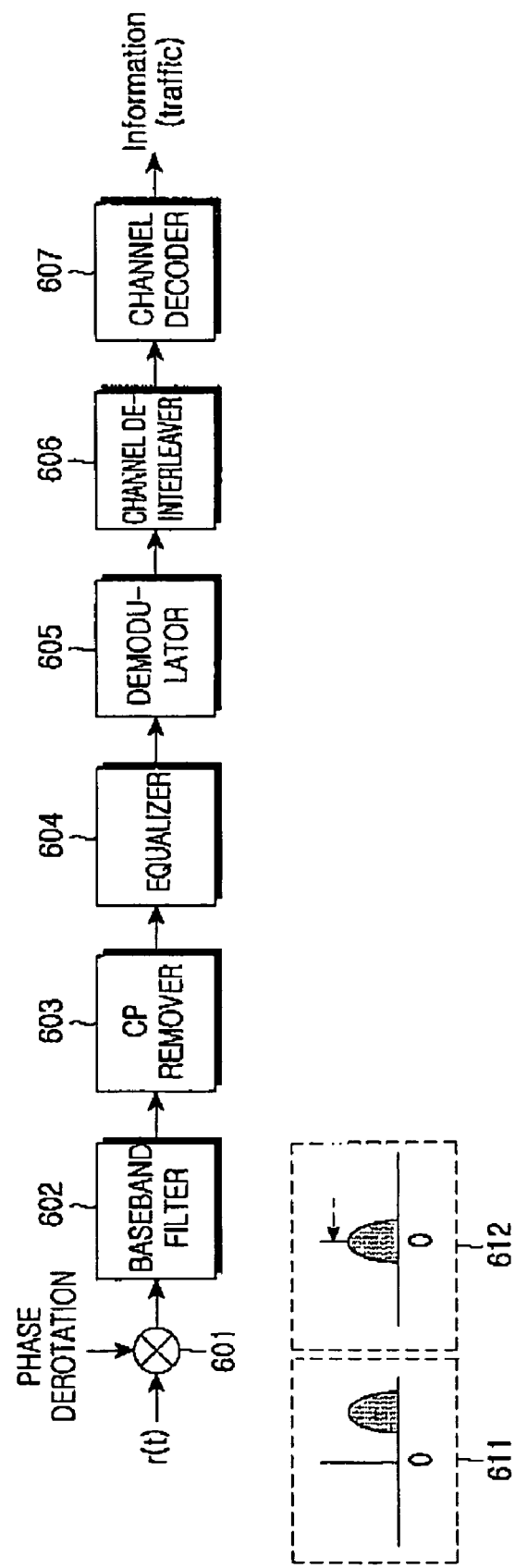
FIG. 6 is a block diagram of a typical SC-FDMA receiver.
Figure 8:
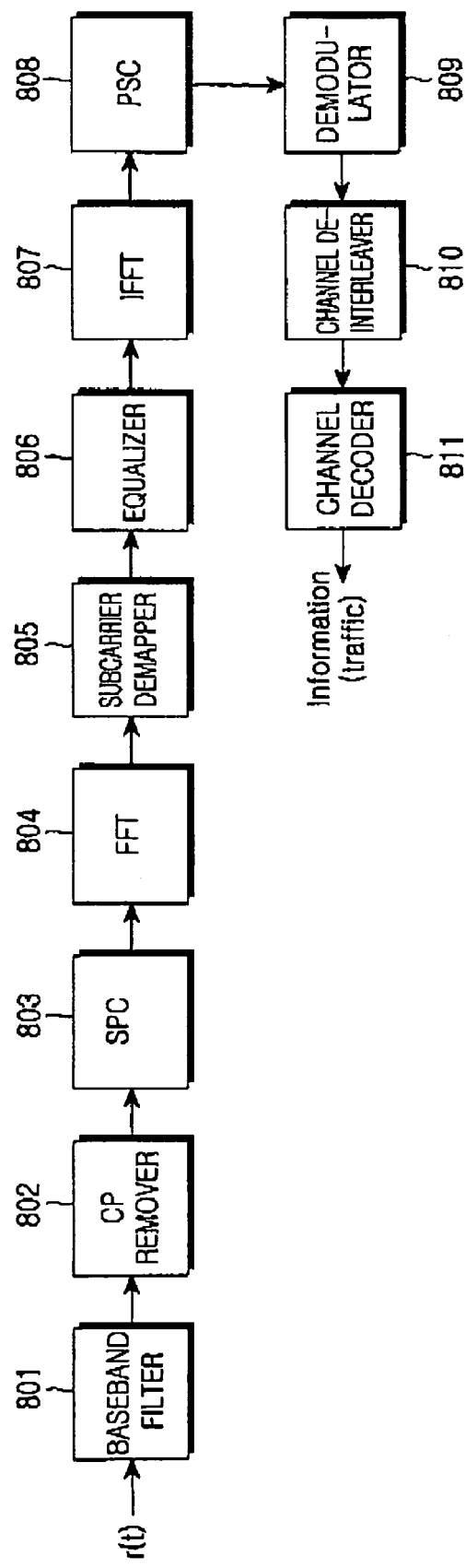
FIG. 8 is a block diagram of a typical SC-FDMA receiver that implements SC-FDMA in a frequency domain.

Referring to FIG. 11, a first multiplier 1102 multiplies a received hybrid multiple access signal 1101 by the carrier frequency f1 preset for CDMA transmission and a CDMA signal receiver 1104 demodulates the product to CDMA data. The CDMA signal receiver 1104 is the typical CDMA receiver illustrated in FIG. 2. A second multiplier 1103 multiplies the received hybrid multiple access signal 1101 by the carrier frequency f2 preset for orthogonal transmission and an orthogonal signal receiver 1105 demodulates the product to orthogonal data. The orthogonal signal receiver 1105 is the typical orthogonal receiver illustrated in FIG. 4, 6 or 8.

Figure 12A:
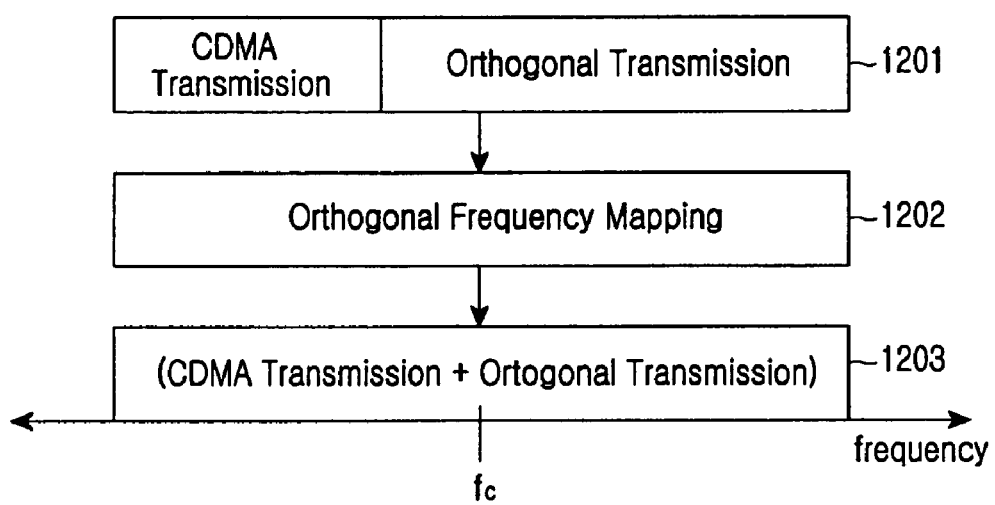
FIGS. 12A, 12B and 12C illustrate CDMA transmission and orthogonal transmission in the same carrier frequency, distinguishable on a frequency axis in the hybrid multiple access scheme according to the present invention.
Figure 12B:
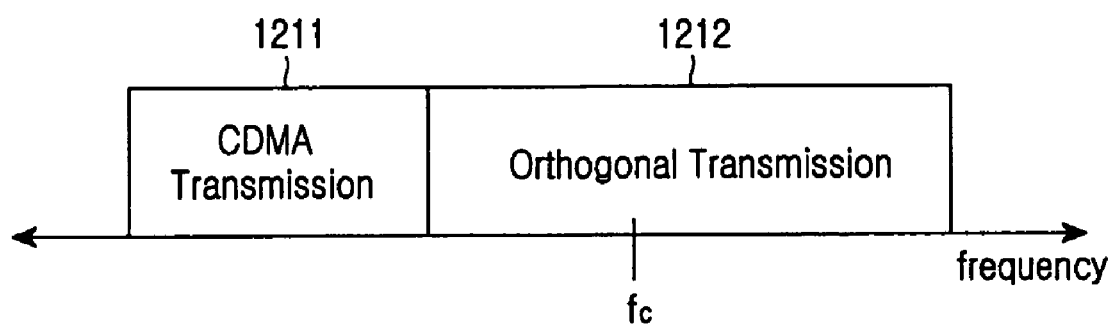
Figure 12C:
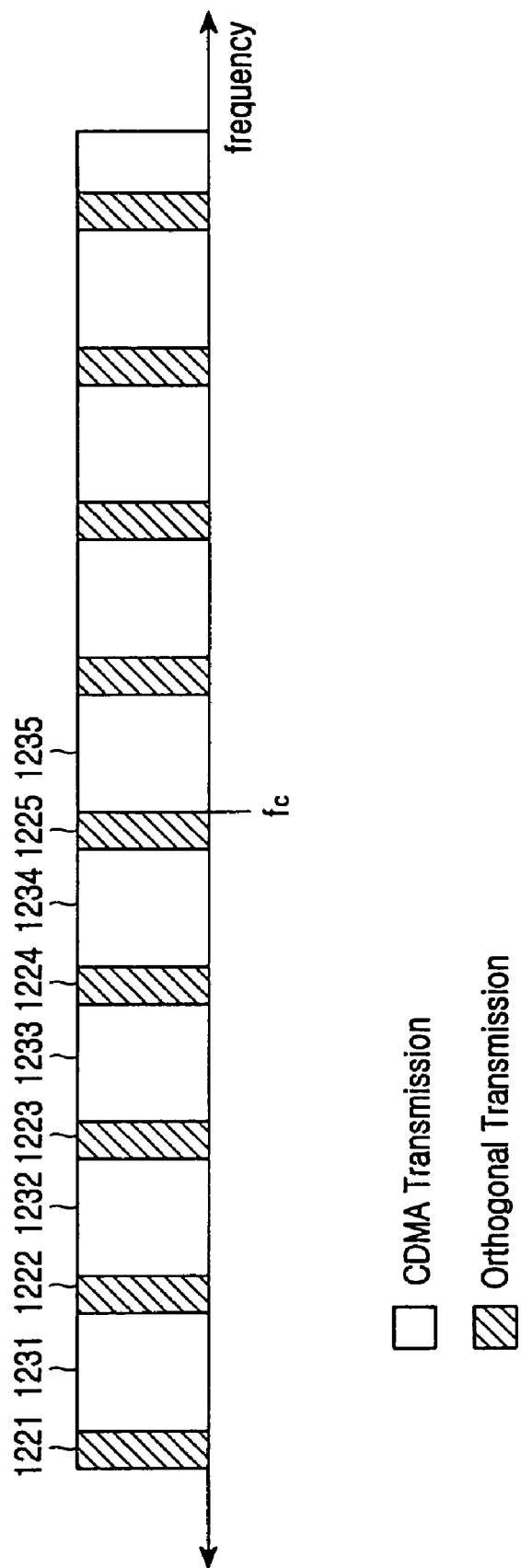

FIGS. 12A, 12B and 12C illustrate CDMA transmission and orthogonal transmission that are carried out in the same carrier frequency, distinguished on a frequency axis in the hybrid multiple access scheme according to the present invention.

Referring to FIGS. 12A, 12B and 12C, CDMA transmission and orthogonal transmission 1201 occurs in combination as denoted by reference numeral 1203 through orthogonal frequency mapping 1202 across the total system frequency band. For example, orthogonal subcarriers can be used for the orthogonal frequency mapping in an OFDMA system. The orthogonal frequency mapping 1202 can be carried out in two patterns.

One pattern is a successive mapping of CDMA transmission and orthogonal transmission as illustrated in FIG. 12B. The other pattern is a mixed mapping of CDMA transmission and orthogonal transmission as illustrated in FIG. 12C.

Figure 13A:
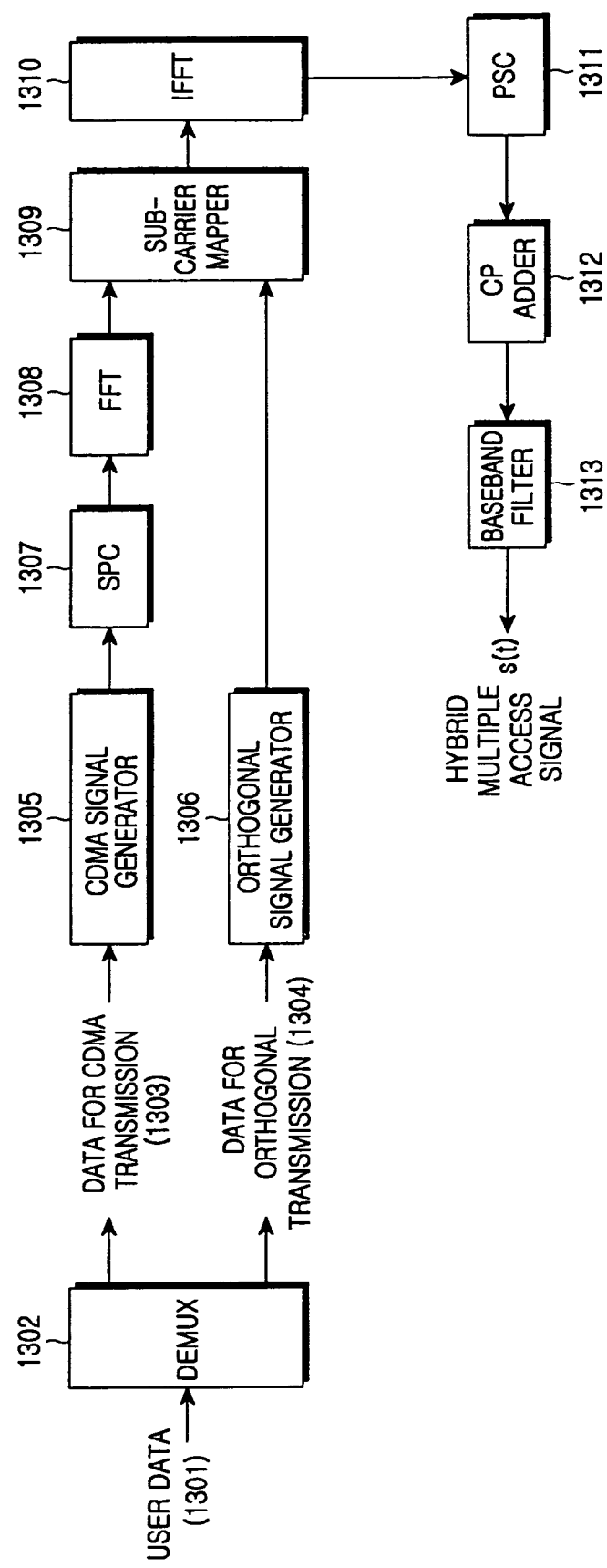
FIGS. 13A, 13B and 13C are block diagrams of a transmitter for generating a hybrid multiple access signal in the scheme illustrated in FIGS. 12A, 12B and 12C.
Figure 13B:
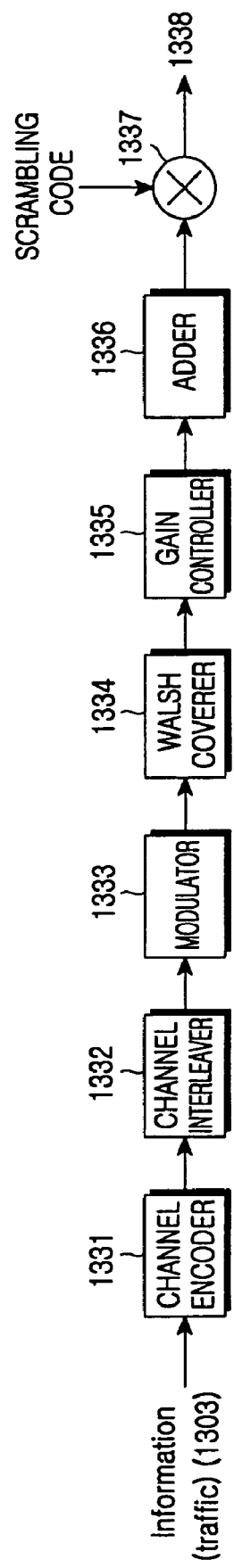
Figure 13C:
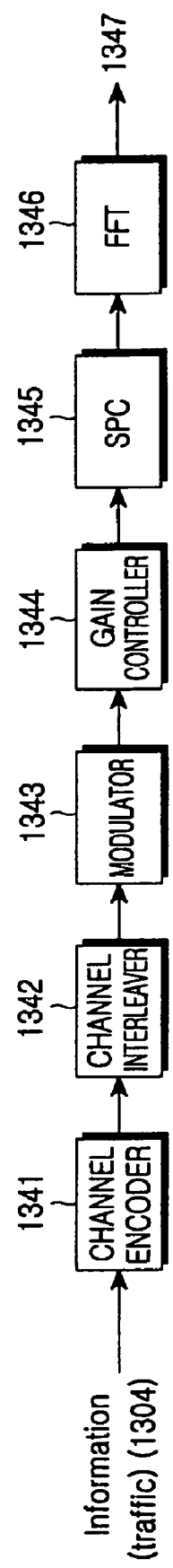

FIGS. 13A, 13B and 13C are block diagrams of a transmitter for generating a hybrid multiple access signal in the scheme illustrated in FIGS. 12A, 12B and 12C.

Referring to FIGS. 13A, 13B and 13C, a DEMUX 1302 demultiplexes user data 1301 into data 1303 for CDMA transmission and data 1304 for orthogonal transmission. A CDMA signal generator 1305 having the configuration illustrated in FIG. 13B converts the data 1303 to CDMA data.

Referring to FIG. 13B, a channel encoder 1331 encodes the data 1303 according to a predetermined channel encoding method. The channel encoder 1331 can be a block encoder, a convolutional encoder, a turbo encoder, an LDPC encoder, or the like. A channel interleaver 1332 interleaves the coded data according to a predetermined channel interleaving method. While not shown in FIG. 13B, it is obvious that a rate matcher including a repeater and a puncturer may reside between the channel encoder 1331 and the channel interleaver 1332. A modulator 1333 modulates the interleaved data in QPSK, 8PSK, 16QAM, or the like. A Walsh coverer 1334 Walsh-covers the modulation symbols. In general, one MS has various physical channels including a pilot channel, a traffic channel, and a power control channel and a different Walsh function is preset for each physical channel. Hence, the MS performs the Walsh covering using a predetermined Walsh function for a physical channel to be sent. A gain controller 1335 multiplies the Walsh-covered signal by a gain suitable for the physical channel according to a predetermined rule.

The channel encoding in the channel encoder 1331 to the gain control in the gain controller 1335 take place independently for each physical channel. Gain-controlled signals for physical channels are summed in an adder 1336. A scrambler 1337 multiples the sum by a user-specific scrambling code. The resulting scrambled signal 1338 is the CDMA data output from the CDMA signal generator 1305.

Referring to FIG. 13A again, an SPC 1307 parallelizes the CDMA data and an FFT processor 1308 FFT-processes the parallel signals.

The data 1304 is provided to an orthogonal signal generator 1306. The orthogonal signal generator 1306 has the configuration illustrated in FIG. 13C.

Referring to FIG. 13C, a channel encoder 1341, a channel interleaver 1342, a modulator 1343, and a gain controller 1344 operate in the same manner as their counterparts illustrated in FIG. 13B and thus their description is not provided herein. An SPC 1345 converts a serial gain-controlled signal received from the gain controller 1344 to parallel signals. An FFT 1346 FFT-processes the parallel signals. The output of the FFT processor 1346 is denoted by reference numeral 1347.

One thing to note is that the FFT processor 1346 is not required if the orthogonal signal is an OFDMA signal. The OFDMA transmitter of FIG. 3 differs from the SC-FDMA transmitter of FIG. 7 in terms of the presence or absence of an FFT processor before a subcarrier mapper. Therefore, the FFT processor 1346 is not used if the orthogonal signal is an OFDMA signal and used if the orthogonal signal is an SC-FDMA signal.

Referring to FIG. 13A again, a subcarrier mapper 1309 receives the FFT signals from the FFT processor 1308 and the orthogonal signal from the orthogonal signal generator 1306, and maps the received signals to subcarriers according to a predetermined rule, i.e. so that the CDMA signal and the orthogonal signal are successive as illustrated in FIG. 12B or are mixed as illustrated in FIG. 12C.

An IFFT processor 1310 IFFT-processes the mapped signals and a PSC 1311 converts the parallel IFFT signals to a serial signal. A CP adder 1312 adds a CP to the serial signal. After processing the CP-added signal in a baseband filter 1313, a hybrid multiple access signal is produced.

Figure 14:
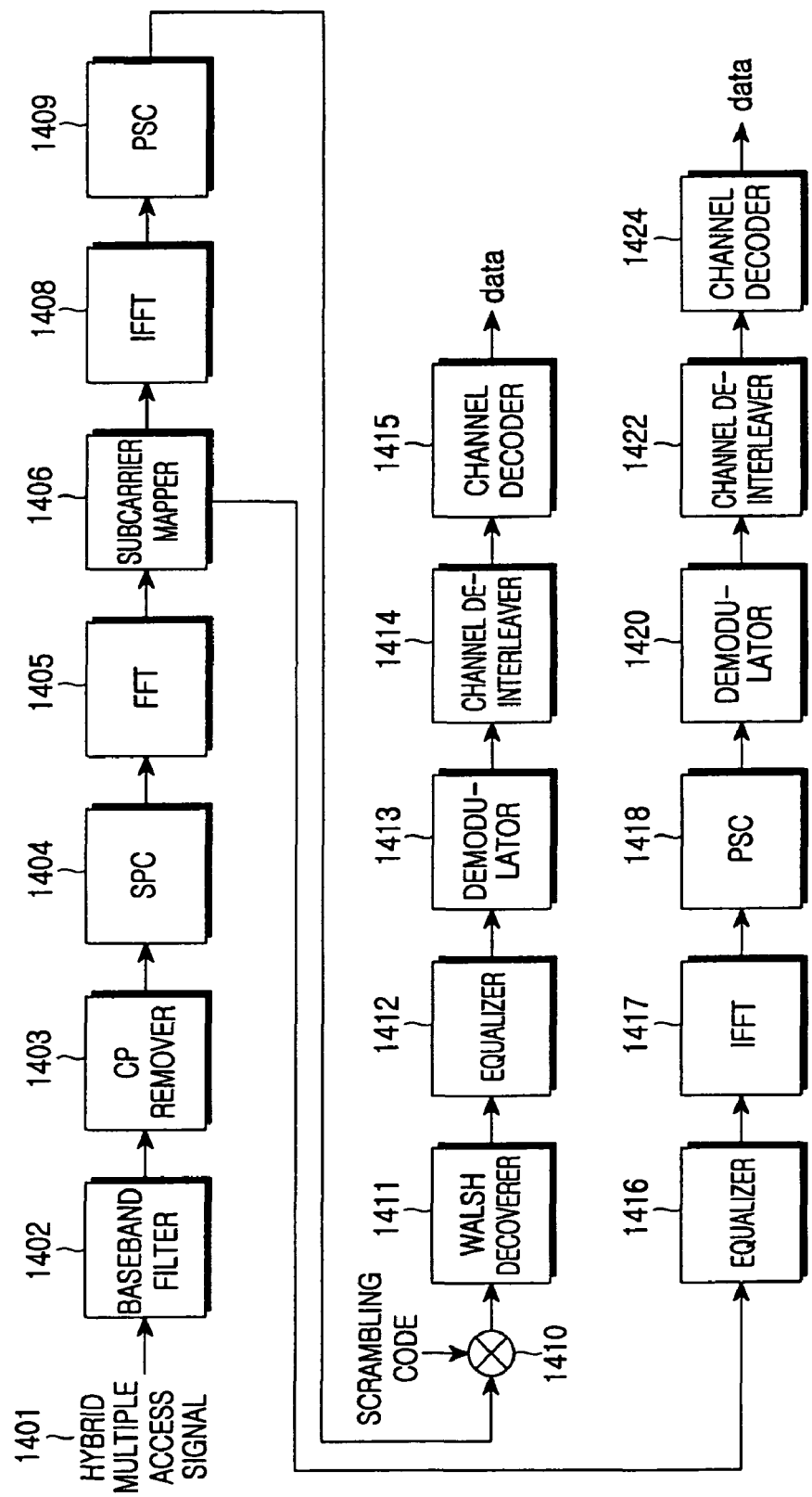
FIG. 14 is a block diagram of a receiver for receiving a hybrid multiple access signal generated in the scheme illustrated in FIGS. 12A, 12B and 12C.

FIG. 14 is a block diagram of a receiver for receiving a hybrid multiple access signal generated in the scheme illustrated in FIGS. 12A, 12B and 12C.

Referring to FIG. 14, a baseband filter 1402, which is a matched filter corresponding to the baseband filter 1313 illustrated in FIG. 13, filters a received hybrid multiple access signal 1401. A CP remover 1403 removes a CP from the output of the baseband filter 1402 according to a predetermined method. An SPC 1404 converts the CP-free signal to parallel signals.

An FFT processor 1405 FFT-processes the parallel signals. A subcarrier demapper 1406 distinguishes a CDMA signal from an orthogonal signal by operating in the reverse order of the subcarrier mapping in the subcarrier mapper 1309 illustrated in FIG. 13. An IFFT processor 1408 IFFT-processes the CDMA signal and a PSC 1409 serializes the IFFT signals. Subsequently, the serial signal is subject to CDMA reception in a scrambler 1410 to a channel decoder 1415. The scrambler 1410 and a Walsh decoverer 1411 operate in the same manner as in the CDMA receiver illustrated in FIG. 2.

A channel equalizer 1406 channel-equalizes the orthogonal signal received from the subcarrier demapper 1406 according to a predetermined channel equalization method. The channel equalization can be performed in many ways, which are beyond the scope of the present invention.

An IFFT processor 1417 IFFT-processes the channel-equalized signal. For the same reason clarified with reference to FIG. 13, the IFFT processor 1417 is not used if the orthogonal signal is an OFDMA signal. A PSC 1418 serializes the IFFT signals. A demodulator 1420 demodulates the serial signal according to a predetermined demodulation method such as 16QAM, 8PSK, QPSK, or the like. A channel deinterleaver 1422 deinterleaves the demodulated signal according to a predetermined method and a channel decoder 1424 channel-decodes the deinterleaved signal, thereby producing final data.

Figure 15:
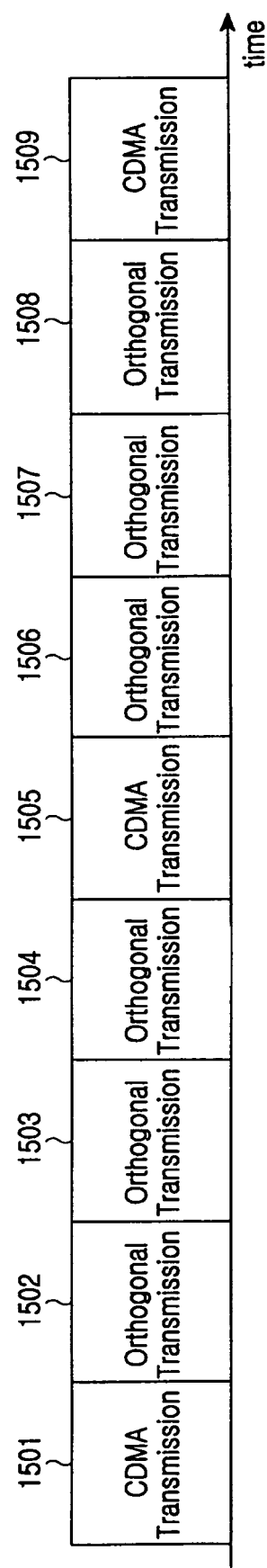
FIG. 15 illustrates CDMA transmission and orthogonal transmission occurring at different transmission times in the hybrid multiple access scheme according to the present invention.

FIG. 15 illustrates CDMA transmission and orthogonal transmission distinguishably occurring at different transmission times in the hybrid multiple access scheme according to the present invention.

Referring to FIG. 15, predetermined parts of a total time period are allocated to CDMA transmission and the remaining parts are allocated to orthogonal transmission. The ratio between the CDMA transmission period and the orthogonal transmission period and the lengths of the CDMA transmission period and the orthogonal transmission period are variable and information about a variation regarding the CDMA transmission period and the orthogonal transmission period can be broadcast to all MSs. That is, CDMA transmission and orthogonal transmission may take place in a different manner from those denoted by reference numerals 1501 to 1509 in FIG. 15.

Figure 16:
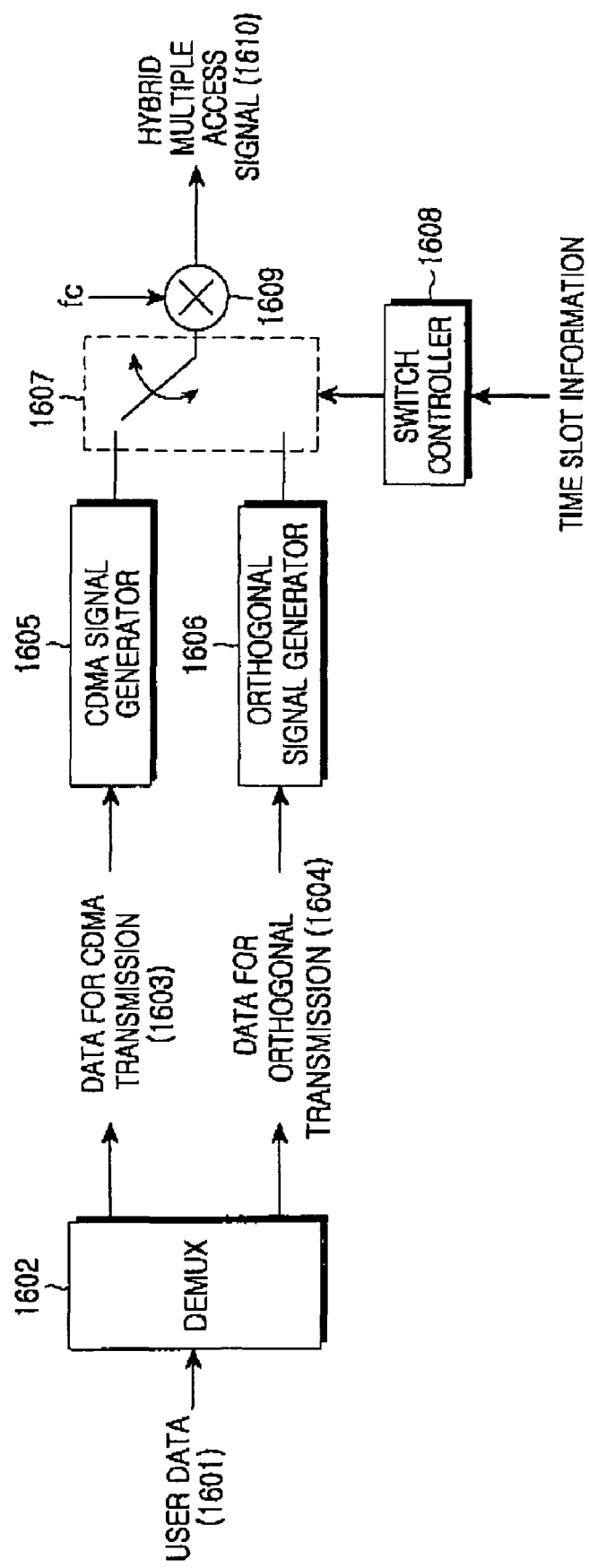
FIG. 16 is a block diagram of a transmitter for performing CDMA transmission and orthogonal transmission at different transmission times as illustrated in FIG. 15 in the hybrid multiple access scheme according to the present invention.

FIG. 16 is a block diagram of a transmitter for performing CDMA transmission and orthogonal transmission distinguished at different transmission times as illustrated in FIG. 15 in the hybrid multiple access scheme according to the present invention.

Referring to FIG. 16, a DEMUX 1602 demultiplexes user data 1601 into data 1603 for CDMA transmission and data 1604 for orthogonal transmission. A CDMA signal generator 1605, which is identical to the typical CDMA signal generator illustrated in FIG. 1, converts the data 1603 to a CDMA signal. An orthogonal signal generator 1606 converts the data 1604 to an orthogonal signal. The orthogonal signal generator 1606 is identical to the typical orthogonal signal generator illustrated in FIG. 3, 5 or 7.

A switch 1607 switches to the CDMA signal generator 1605 or the orthogonal signal generator 1606 and thus outputs the CDMA signal or the orthogonal signal under the control of a switch controller 1608. The switch controller 1608 determines based on received time slot information whether a current transmission period is for the CDMA signal or the orthogonal signal as described with reference to FIG. 15 and correspondingly controls the switch 1607. A hybrid multiple access signal 1610 is created by multiplying the switched CDMA signal or OFDM signal by a predetermined carrier frequency fc.

Figure 17:
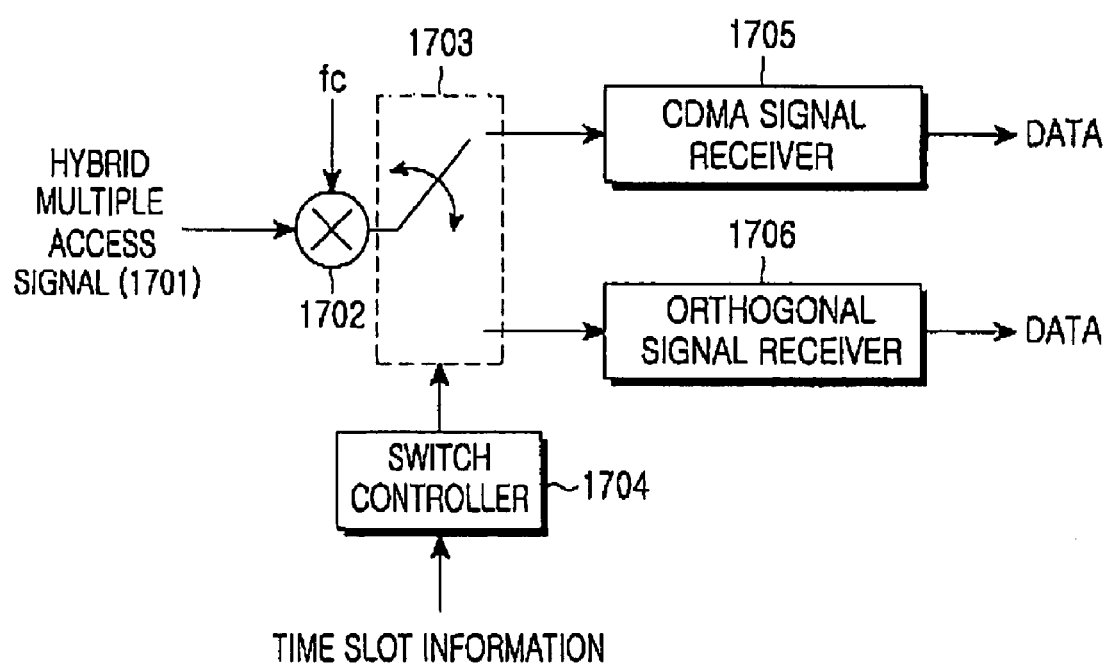
FIG. 17 is a block diagram of a receiver in case of CDMA transmission and orthogonal transmission occurring at different transmission times as illustrated in FIG. 15 in the hybrid multiple access scheme according to the present invention.

FIG. 17 is a block diagram of a receiver in case of CDMA transmission and orthogonal transmission occurring at different transmission times as illustrated in FIG. 15 in the hybrid multiple access scheme according to the present invention.

Referring to FIG. 17, a multiplier 1702 multiplies a received hybrid multiple access signal 1701 by a predetermined carrier frequency fc and a switch 1703 switches the product to a CDMA signal receiver 1705 or an orthogonal signal receiver 1706 under the control of a switch controller 1704. The switch controller 1704 determines based on received time slot information whether a current reception period is for CDMA reception or orthogonal reception as described with reference to FIG. 15 and correspondingly controls the switch 1703.

When the switch 1703 switches the multiplier 1702 to the CDMA signal receiver 1705, the CDMA signal receiver 1705 demodulates the product to CDMA data. The CDMA signal receiver 1705 is the typical CDMA receiver illustrated in FIG. 2. When the switch 1703 switches the multiplier 1702 to the orthogonal signal receiver 1706, the orthogonal signal receiver 1706 demodulates the product to orthogonal data. The orthogonal signal receiver 1706 is the typical orthogonal receiver illustrated in FIG. 4, 6 or 8.

Figure 18:
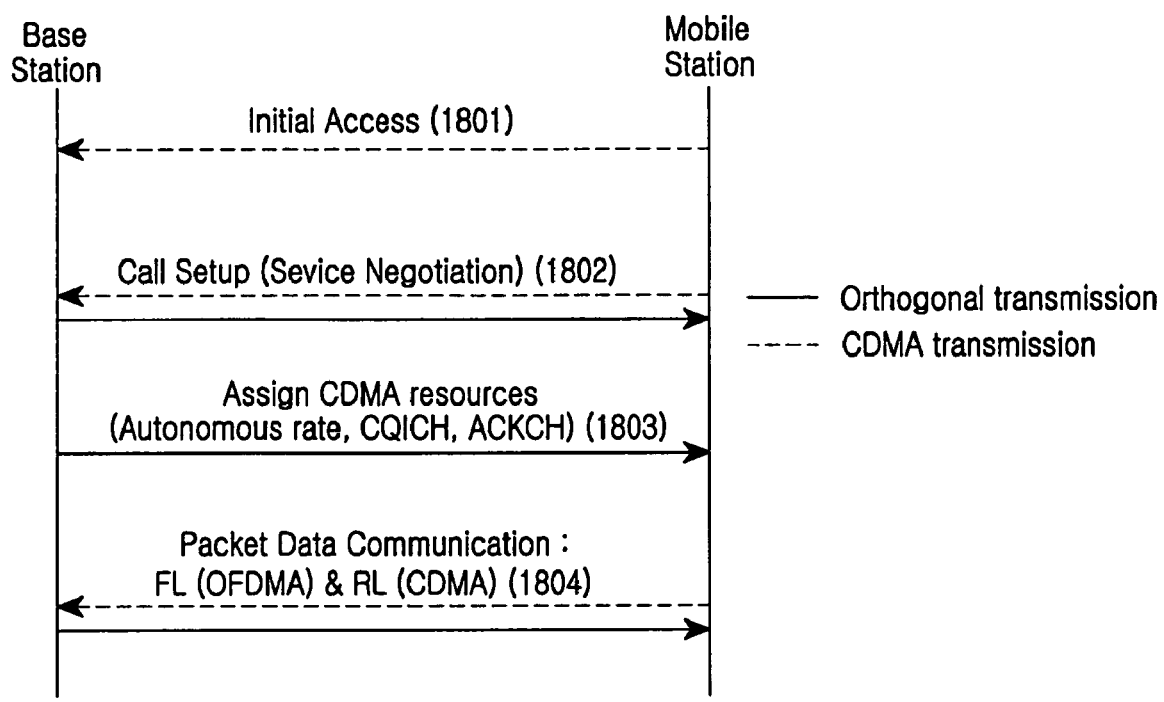
FIG. 18 is a diagram illustrating a signal flow in the case where uplink transmission is carried out only in CDMA in the hybrid multiple access scheme according to the present invention.
Figure 19:
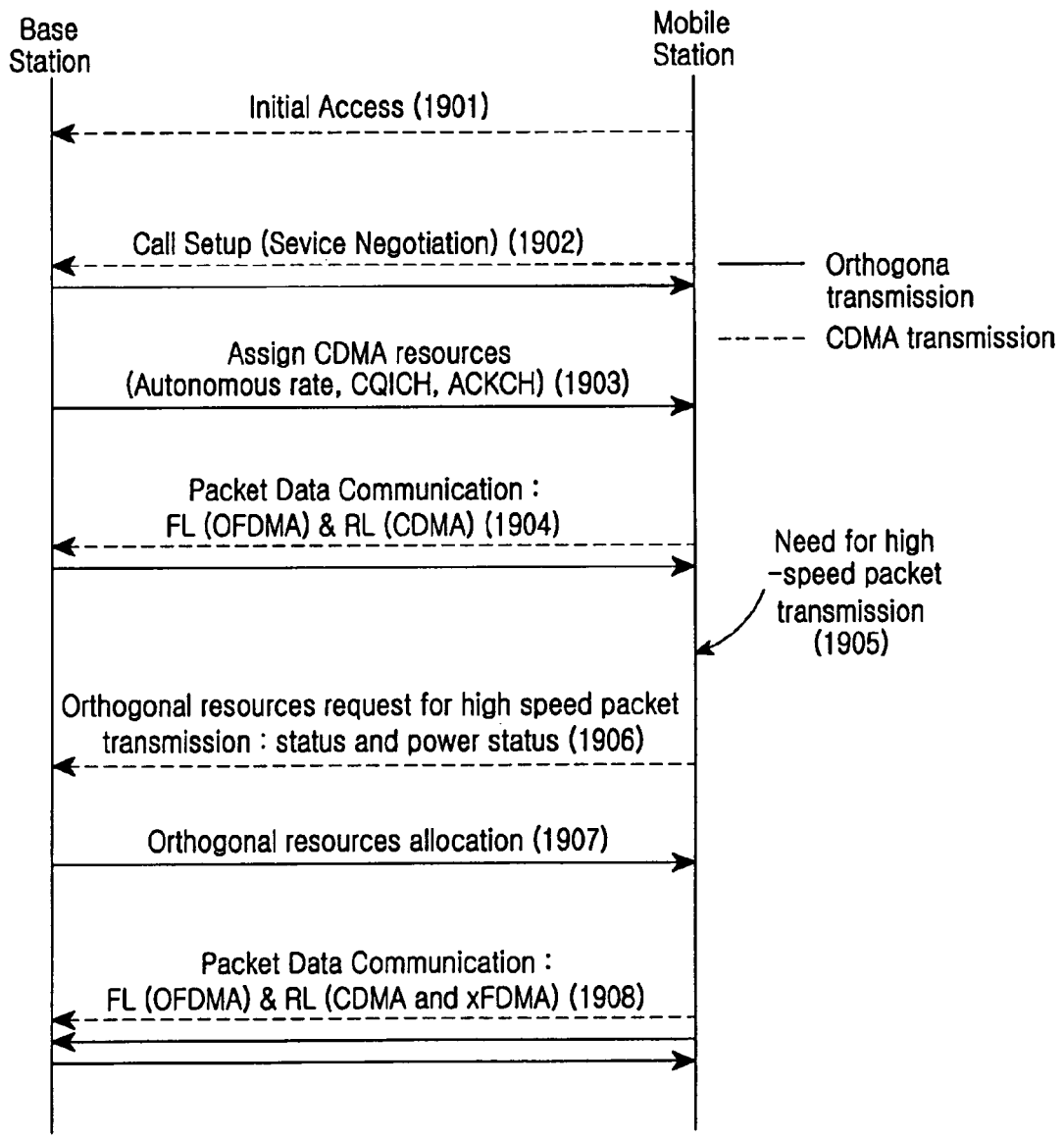
FIG. 19 is a diagram illustrating a signal flow in the case where both CDMA transmission and orthogonal transmission are allowed as uplink transmission schemes in the hybrid multiple access scheme according to the present invention.
Figure 20:
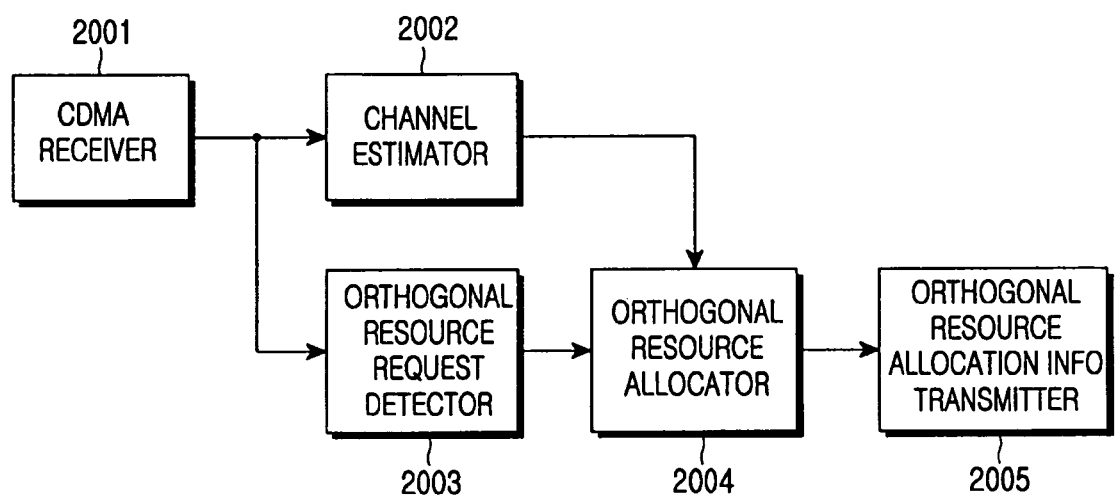
FIG. 20 is a block diagram of a Base Station (BS) for allocating orthogonal resources to an MS according to the present invention.

FIGS. 18, 19 and 20 illustrate examples of hybrid use of CDMA transmission and orthogonal transmission in the hybrid multiple access scheme according to the present invention. With reference to FIGS. 18, 19 and 20, the control operations of the DEMUXes 1002, 1302 and 1602 will be described in great detail.

In the hybrid multiple access scheme of the present invention, a multiple access scheme is selected according to the characteristics and requirement of a service to be provided and the status of an MS. Basically, a BS allows every MS CDMA transmission.

The MS performs an initial system access by uplink CDMA transmission. Relatively small amounts of traffic are sent in CDMA, such as voice traffic, frequent real-time small traffic, feedback information about the buffer status and channel status of the MS, ACK/NACK for downlink HARQ, etc.

Orthogonal transmission is generally applied to an MS that requires high-speed packet data transmission. Therefore, when the MS needs to send packets at a high rate during the transmission of a small amount of packet data in CDMA, the MS requests orthogonal resources to the BS by CDMA transmission. The orthogonal resource request may contain feedback information indicating the buffer status and channel status of the MS. If it is determined that orthogonal resources are available, the BS additionally allocates orthogonal resources to the MS, or simultaneously with commanding the MS to discontinue the on-going CDMA transmission.

One of the features of the uplink hybrid multiple access scheme is that the BS performs a closed-loop power control on the CDMA transmission and applies an AMC control to the orthogonal transmission. The AMC control is a technique for sending a Modulation and Coding Scheme (MCS) level and a power level for each transmission as scheduling information without performing the closed-loop power control on the uplink orthogonal transmission.

FIG. 18 is a diagram illustrating a signal flow in the case where uplink transmission is carried out only in CDMA in the hybrid multiple access scheme according to the present invention. In FIG. 18, a dotted line denotes CDMA transmission and a solid line denotes orthogonal transmission.

Referring to FIG. 18, the MS performs an initial access process by CDMA transmission in step 1801. The initial access process is beyond the scope of the present invention and thus its description is not provided herein. In step 1802, the BS performs a predetermined initial service negotiation with the MS. According to the negotiation result, the BS allocates CDMA resources to the MS for an autonomous rate, a Channel Quality Channel (CQICH), and an ACK CHannel (ACKCH) in step 1803. The autonomous rate is an allowed data rate at which the MS can send data without control of the BS. The CQICH is a channel that carries downlink channel quality information. The ACKCH is a channel that delivers an ACK/NACK for downlink transmitted data.

The MS sends data using the resources in CDMA and receives an OFDMA signal from the BS in a predetermined procedure in step 1804.

FIG. 19 is a diagram illustrating a signal flow in the case where both CDMA transmission and orthogonal transmission are allowed for uplink transmission in the hybrid multiple access scheme according to the present invention. In FIG. 19, a dotted line denotes CDMA transmission and a solid line denotes orthogonal transmission.

Referring to FIG. 19, the MS performs an initial access process by CDMA transmission in step 1901. The initial access process is beyond the scope of the present invention and thus its description is not provided herein. In step 1902, a BS performs a predetermined initial service negotiation with the MS. According to the negotiation result, the BS allocates CDMA resources to the MS for an autonomous rate, a CQICH, and an ACKCH in step 1903. The MS sends data using the resources in CDMA and receives an OFDMA signal from the BS according to a predetermined procedure in step 1904. That is, downlink data is sent in OFDMA, whereas uplink data is sent in CDMA. During the data communications in CDMA, it may occur that the MS needs additional orthogonal transmission. For example, when the MS needs to send data at high rate in step 1905, the MS requests orthogonal resources to the BS in step 1906. The request may contain information about the buffer occupancy or transmit power of the MS. In step 1907, the BS allocates additional orthogonal resources to the MS. The MS then sends data using the orthogonal resources in step 1908. Thus, CDMA transmission and orthogonal transmission can occur simultaneously on the uplink.

FIG. 20 is a block diagram of the BS for allocating orthogonal resources to the MS according to the present invention.

Referring to FIG. 20, a CDMA signal receiver 2001 receives a CDMA signal from the MS. A pilot signal extracted from the CDMA signal is provided to a channel estimator 2002. The channel estimator 2002 estimates the uplink channel status of the MS using the pilot signal. Specifically, the BS estimates the uplink channel status of the MS along the frequency axis. That is, the BS determines at which frequency the channel is relatively good and at which frequency the channel is relatively bad. This determination can be accomplished by any known procedures to determine channel quality.

An orthogonal resource request detector 2003 identifies the MS that has requested orthogonal resources from the output of the CDMA signal receiver 2001. An orthogonal resource allocator 2004 allocates orthogonal resources based on information about the uplink channel status received from the orthogonal resource allocator 2004 and the orthogonal resource request detection result received from the orthogonal resource request detector 2003. An orthogonal resource allocation info transmitter 2005 sends information about the allocated orthogonal resources according to a predetermined procedure.

Figure 21:
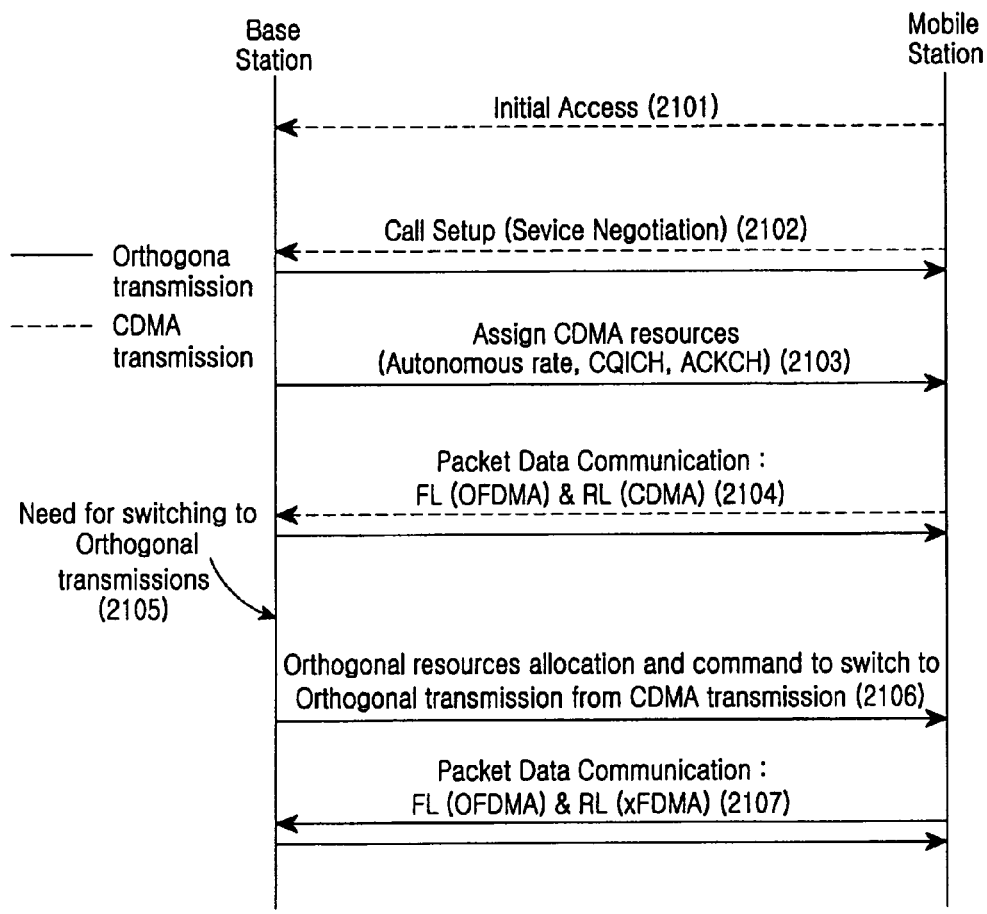
FIG. 21 is a diagram illustrating a signal flow for switching from uplink CDMA transmission to uplink orthogonal transmission in an MS using the hybrid multiple access scheme according to the present invention.

FIG. 21 is a diagram illustrating a signal flow for switching from uplink CDMA transmission to uplink orthogonal transmission in the MS using the hybrid multiple access scheme according to the present invention. In FIG. 21, a dotted line denotes CDMA transmission and a solid line denotes orthogonal transmission.

Referring to FIG. 21, the MS performs an initial access process by CDMA transmission in step 2101. The initial access process is beyond the scope of the present invention and thus its description is not provided herein. In step 2102, the BS performs a predetermined initial service negotiation with the MS. According to the negotiation result, the BS allocates CDMA resources to the MS for an autonomous rate, a CQICH, and an ACKCH in step 2103. The MS sends data using the resources in CDMA and receives an OFDMA signal from the BS according to a predetermined procedure in step 2104.

During the data communications, it may occur that switching from the CDMA transmission to orthogonal transmission is needed as in step 2105. When orthogonal transmission is more efficient than CDMA transmission, CDMA to orthogonal transmission switching is required. For example, when an MS located at a cell boundary intends to increase data rate, the MS needs orthogonal transmission. The BS allocates specific orthogonal resources to the MS and sends a command indicating switching from the CDMA transmission to the orthogonal transmission to the MS in step 2106. The command may include information about an action time of the switching. In step 2107, the MS switches from the CDMA transmission to the orthogonal transmission.

As is apparent from the above description, the hybrid multiple access scheme of the present invention enables a more efficient multiple access and, as a result, achieves a high spectral efficiency.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A transmitter in a mobile communication system supporting an orthogonal transmission scheme and a non-orthogonal transmission scheme, comprising:
   a non-orthogonal signal generator for generating a first signal according to the non-orthogonal transmission scheme;
   an orthogonal signal generator for generating a second signal according to the orthogonal transmission scheme; and
   a subcarrier mapper for orthogonal frequency mapping the first signal and the second signal according to a predetermined pattern for simultaneously transmitting the first signal and the second signal.

2. The transmitter of claim 1, wherein the non-orthogonal transmission scheme is Code Division Multiple Access (CDMA).

3. The transmitter of claim 1, wherein the first signal is at least one of voice data and low-speed packet data.

4. The transmitter of claim 1, wherein the orthogonal transmission scheme is at least one of Orthogonal Frequency Division Multiple Access (OFDMA), Time Division Multiple Access (TDMA), Frequency Division Multiple Access (FDMA), and Single Carrier Frequency Division Multiple Access (SC-FDMA).

5. The transmitter of claim 1, wherein the second signal is high-speed packet data.

6. The transmitter of claim 1, wherein the first signal is at least one of voice data and low-speed packet data and the second signal is high-speed packet data.

7. The transmitter of claim 1, wherein the predetermined pattern is a pattern in which the first signal and the second signal are successive.

8. The transmitter of claim 1, wherein the predetermined pattern is a pattern in which the first signal is mixed with the second signal.

9. The transmitter of claim 1, wherein the predetermined pattern is a pattern in which the first signal and the second signal are successive or mixed with each other.

10. The transmitter of claim 1, wherein the subcarrier mapper comprises:
    a switch for outputting one of the first signal and the second signal in a predetermined period;
    a multiplier for multiplying the output signal by a predetermined carrier frequency; and
    a switch controller for determining transmission periods for the first signal and the second signal based on externally received time slot information and controlling the switch according to the transmission periods.

11. A method for transmitting data at a transmitter in a mobile communication system supporting an orthogonal transmission scheme and a non-orthogonal transmission scheme, comprising:
    generating a first signal according to the non-orthogonal transmission scheme and a second signal according to the orthogonal transmission scheme; and
    performing orthogonal frequency mapping on the first signal and the second signal according to a predetermined pattern for simultaneously transmitting the first signal and the second signal.

12. The method of claim 11, wherein the predetermined pattern is a pattern in which the first signal and the second signal are successive.

13. The method of claim 11, wherein the predetermined pattern is a pattern in which the first signal is mixed with the second signal.

14. The method of claim 11, wherein the predetermined pattern is a pattern in which the first signal and the second signal are successive or mixed with each other.

15. The method of claim 11, wherein the non-orthogonal transmission scheme is Code Division Multiple Access (CDMA).

16. The method of claim 11, wherein the first signal is at least one of voice data and low-speed packet data.

17. The method of claim 11, wherein the second signal is high-speed packet data.

18. The method of claim 11, wherein the orthogonal transmission scheme is at least one of Orthogonal Frequency Division Multiple Access (OFDMA), Time Division Multiple Access (TDMA), Frequency Division Multiple Access (FDMA), and Single Carrier Frequency Division Multiple Access (SC-FDMA).

19. The method of claim 11, wherein the first signal is at least one of voice data and low-speed packet data and the second signal is high-speed packet data.

20. The method of claim 11, wherein the orthogonal mapping comprises:
outputting one of the first signal and the second signal in a predetermined period according to time slot information that defines transmission period information; and
multiplying the output signal by a predetermined carrier frequency.

21. A receiver in a mobile communication system supporting an orthogonal transmission scheme and a non-orthogonal transmission scheme, comprising:
a subcarrier demapper for receiving a hybrid multiple access signal orthogonal-frequency-mapped according to a predetermined pattern and separately outputting a first signal of the non-orthogonal transmission scheme and a second signal of the orthogonal transmission scheme;
a non-orthogonal signal receiver for outputting user data by demodulating the first signal; and
an orthogonal signal receiver for outputting user data by demodulating the second signal.

22. The receiver of claim 21, wherein the non-orthogonal transmission scheme is Code Division Multiple Access (CDMA).

23. The receiver of claim 21, wherein the first signal is at least one of voice data and low-speed packet data.

24. The receiver of claim 21, wherein the orthogonal transmission scheme is at least one of Orthogonal Frequency Division Multiple Access (OFDMA), Time Division Multiple Access (TDMA), Frequency Division Multiple Access (FDMA), and Single Carrier Frequency Division Multiple Access (SC-FDMA).

25. The receiver of claim 21, wherein the second signal is high-speed packet data.

26. The receiver of claim 21, wherein the first signal is at least one of voice data and low-speed packet data and the second signal is high-speed packet data.

27. The receiver of claim 21, wherein the predetermined pattern is a pattern in which the first signal and the second signal are successive.

28. The receiver of claim 21, wherein the predetermined pattern is a pattern in which the first signal is mixed with the second signal.

29. The receiver of claim 21, wherein the predetermined pattern is a pattern in which the first signal and the second signal are successive or mixed with each other.

30. The receiver of claim 21, wherein the subcarrier demapper comprises:
a multiplier for multiplying the hybrid multiple access signal by a predetermined carrier frequency;
a switch for switching the multiplied hybrid multiple access signal to one of the non-orthogonal signal receiver and the orthogonal signal receiver in a predetermined period; and
a switch controller for determining transmission periods for the first signal and the second signal based on time slot information and controlling the switch according to the transmission periods.

31. A method for receiving data at a receiver in a mobile communication system supporting an orthogonal transmission scheme and a non-orthogonal transmission scheme, comprising:
receiving a hybrid multiple access signal orthogonal-frequency-mapped according to a predetermined pattern and separating a first signal of the non-orthogonal transmission scheme from a second signal of the orthogonal transmission scheme;
outputting user data by demodulating the first signal; and
outputting user data by demodulating the second signal.

32. The method of claim 31, wherein the non-orthogonal transmission scheme is Code Division Multiple Access (CDMA).

33. The method of claim 31, wherein the first signal is at least one of voice data and low-speed packet data.

34. The method of claim 31, wherein the second signal is high-speed packet data.

35. The method of claim 31, wherein the first signal is at least one of voice data and low-speed packet data and the second signal is high-speed packet data.

36. The method of claim 31, wherein the orthogonal transmission scheme is at least one of Orthogonal Frequency Division Multiple Access (OFDMA), Time Division Multiple Access (TDMA), Frequency Division Multiple Access (FDMA), and Single Carrier Frequency Division Multiple Access (SC-FDMA).

37. The method of claim 31, wherein the predetermined pattern is a pattern in which the first signal and the second signal are successive.

38. The method of claim 31, wherein the predetermined pattern is a pattern in which the first signal is mixed with the second signal.

39. The method of claim 31, wherein the predetermined pattern is a pattern in which the first signal and the second signal are successive or mixed with each other.

40. The method of claim 31, wherein the receiving and distinguishing comprises:
multiplying the hybrid multiple access signal by a predetermined carrier frequency;
switching the multiplied hybrid multiple access signal as one of the first signal and the second signal according to time slot information that defines transmission period information.

* * * * *